United States Patent
Kolar

(10) Patent No.: US 10,602,672 B2
(45) Date of Patent: Mar. 31, 2020

(54) PLANT CULTIVATION CONTAINER

(71) Applicant: Matej Kolar, Koper (SI)

(72) Inventor: Matej Kolar, Koper (SI)

(73) Assignee: Matej Kolar (SI)

(*) Notice: Subject to any disclaimer, the term of this patent is extended or adjusted under 35 U.S.C. 154(b) by 0 days.

(21) Appl. No.: 16/309,260

(22) PCT Filed: Jun. 16, 2017

(86) PCT No.: PCT/SI2017/000013
§ 371 (c)(1),
(2) Date: Dec. 12, 2018

(87) PCT Pub. No.: WO2018/009151
PCT Pub. Date: Jan. 11, 2018

(65) Prior Publication Data
US 2019/0335678 A1 Nov. 7, 2019

(30) Foreign Application Priority Data
Jul. 6, 2016 (SI) .................... P-201600167

(51) Int. Cl.
*A01G 9/02* (2018.01)
*A01G 9/00* (2018.01)

(52) U.S. Cl.
CPC .......... *A01G 9/02* (2013.01); *A01G 2009/003* (2013.01)

(58) Field of Classification Search
CPC ............................ A01G 9/02; A01G 2009/003
(Continued)

(56) References Cited

U.S. PATENT DOCUMENTS 1,992,878 A * 2/1935 Muller .................... A01G 9/02
47/80
3,238,004 A * 3/1966 Goebel .................. A45C 11/20
312/330.1
(Continued)

FOREIGN PATENT DOCUMENTS

DE          2605256 A1 *  8/1976  ............... A01G 9/02
DE          2807692 A1 *  8/1978  ............... A01G 9/02
(Continued)

OTHER PUBLICATIONS

Translation of DE2807692, espacenet (Year: 1978).*
Translation of CN108738863, espacnet (Year: 2018).*

*Primary Examiner* — Magdalena Topolski
*Assistant Examiner* — Morgan T Barlow
(74) *Attorney, Agent, or Firm* — The Watson IP Group, PLC; Jovan N. Jovanovic

(57) ABSTRACT

The object of the invention is a plant cultivation container, wherein the plants do not need to be transplanted during cultivation or growth. The container is provided with pull-out trays and this allows continuous adaptation of the container volume to the growth and development of the root system. The container of the invention provides for continuous oxygen and air supply to the root system and for development of fibrous roots contrary to root spiralisation which is typical of conventional containers. The pull-out tray has several functions: partitioning of container volume to compartments, retaining of excess water while watering, and as a drip tray when the entire container volume is in use. The walls of the container are provided with slits at various heights which in conjunction with several pull-out trays partition the entire volume of the container along its height to several compartments. The slits are dimensioned in a way to adapt to the thickness and the height of the pull-out tray side walls and the pull-out tray bottom when the pull-out (Continued)

Figure 1:
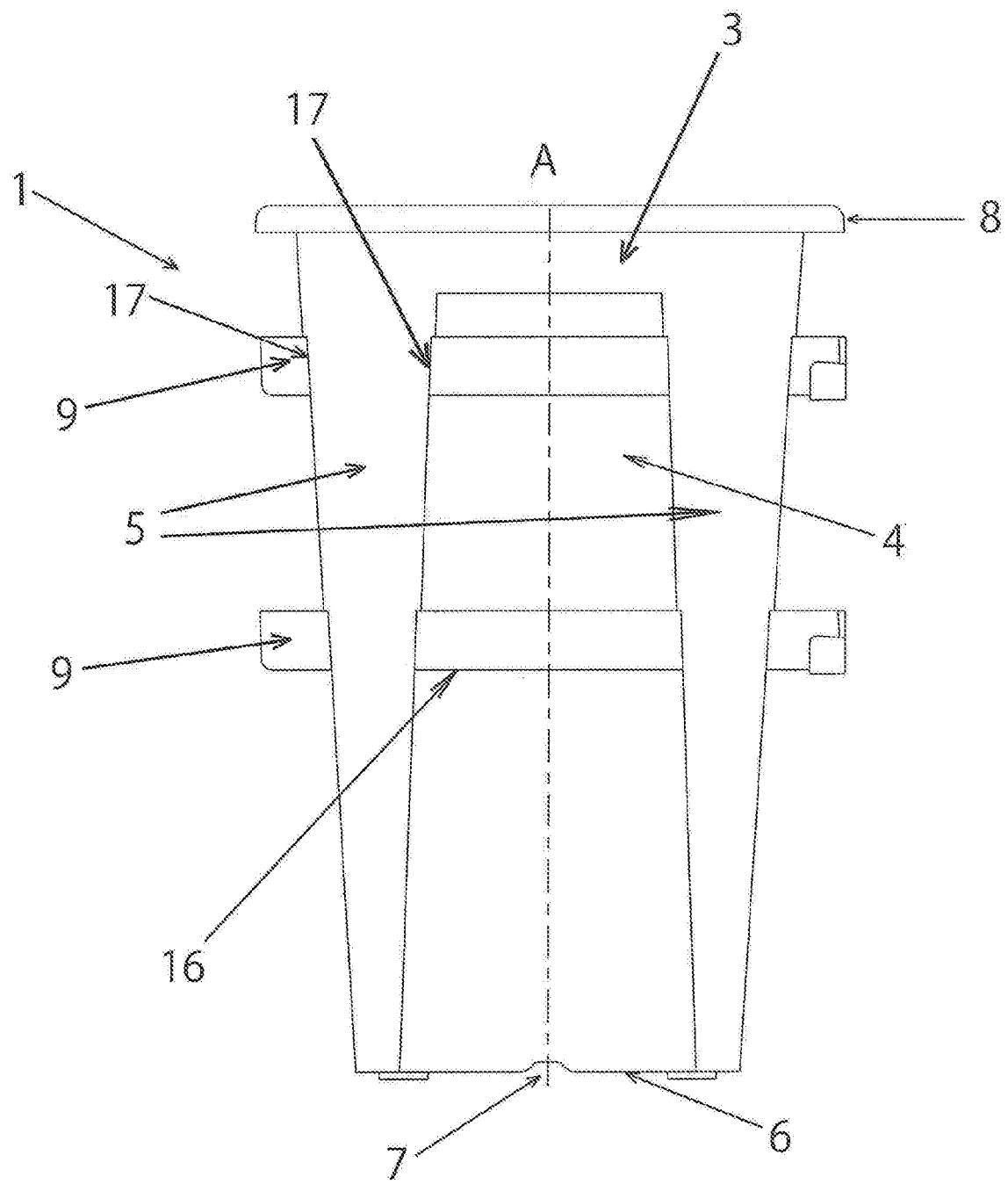

trays are inserted into the slits. The pull-out trays are simply insertable into and removable from the slits and this is why the container volume can simply be adapted to the growth and development of the root system.

14 Claims, 5 Drawing Sheets

(58) Field of Classification Search
USPC .............................................................. 47/85
See application file for complete search history.

(56) References Cited

U.S. PATENT DOCUMENTS

| | | | | |
|---|---|---|---|---|
| 3,720,346 A * | 3/1973 | Cypher | ................... | B65D 25/06 |
| | | | | 220/533 |
| 3,920,144 A * | 11/1975 | Callen | ................... | B65D 25/02 |
| | | | | 220/533 |
| 4,056,897 A * | 11/1977 | Pearce | ..................... | A01G 9/02 |
| | | | | 47/39 |
| 4,251,951 A * | 2/1981 | Heinstedt | ............... | A01G 9/088 |
| | | | | 47/39 |
| 4,255,898 A * | 3/1981 | Greenbaum | ........... | A01G 9/028 |
| | | | | 220/533 |
| 5,430,973 A * | 7/1995 | Luo | .......................... | A01G 9/02 |
| | | | | 47/66.6 |
| 5,852,895 A * | 12/1998 | Sinanan | ................. | A01G 9/022 |
| | | | | 47/33 |
| 7,296,379 B1 * | 11/2007 | Peter | ........................ | A01G 9/02 |
| | | | | 211/88.03 |
| 8,234,812 B1 * | 8/2012 | Colless | ................... | A01G 9/16 |
| | | | | 47/61 |
| 8,413,377 B2 * | 4/2013 | Koyama | .............. | B41J 2/14024 |
| | | | | 347/29 |
| 8,887,439 B2 * | 11/2014 | Daas | ...................... | A01G 9/028 |
| | | | | 47/58.1 R |
| 8,950,113 B1 * | 2/2015 | Schall | .................... | B65D 19/18 |
| | | | | 220/533 |
| 2003/0070224 A1 * | 4/2003 | Walsh | .................. | A47C 19/207 |
| | | | | 5/2.1 |
| 2005/0145458 A1 * | 7/2005 | Cohen | .................... | A45C 5/065 |
| | | | | 190/18 A |
| 2009/0206046 A1 | 8/2009 | Lunato | | |
| 2013/0232871 A1 | 9/2013 | Kempf | | |
| 2014/0238995 A1 * | 8/2014 | Vargas | .................. | B65D 25/08 |
| | | | | 220/523 |
| 2015/0000189 A1 * | 1/2015 | Greis-Avnon | ........... | A01G 9/02 |
| | | | | 47/66.5 |
| 2015/0223405 A1 * | 8/2015 | Riley | ...................... | A01G 9/02 |
| | | | | 47/65.7 |
| 2015/0282437 A1 * | 10/2015 | Ohara | ..................... | A01G 7/00 |
| | | | | 47/66.6 |
| 2015/0342127 A1 * | 12/2015 | Gallant | .................... | A01G 9/02 |
| | | | | 47/20.1 |
| 2016/0050857 A1 * | 2/2016 | Roberts | .................. | A01G 22/00 |
| | | | | 47/66.7 |
| 2016/0316637 A1 * | 11/2016 | Leone | ..................... | A01G 9/02 |
| 2017/0208750 A1 * | 7/2017 | Holby | .................... | A01G 9/021 |
| 2019/0183062 A1 * | 6/2019 | Pham | ..................... | A01G 9/022 |

FOREIGN PATENT DOCUMENTS

| | | | | |
|---|---|---|---|---|
| DE | 4001089 A1 * | 7/1990 | ............... | A01G 9/02 |
| DE | 9412343 U1 * | 11/1994 | ............... | A01G 9/02 |
| DE | 202013010457 U1 * | 1/2014 | ............... | A01G 9/02 |
| EP | 1358792 A2 * | 11/2003 | ............... | A01G 31/06 |
| FR | 2332919 A1 * | 6/1977 | ............... | A01G 9/02 |
| FR | 2402403 A1 | 4/1979 | | |
| FR | 2564691 A1 * | 11/1985 | ............... | A01G 9/02 |
| GB | 2015314 A * | 9/1979 | ............... | A01G 9/02 |
| JP | 06197830 A * | 7/1994 | ............... | A01G 9/02 |
| WO | WO-9410830 A1 * | 5/1994 | ............... | A01G 9/00 |
| WO | WO-02080658 A1 * | 10/2002 | ............... | A01G 9/02 |
| WO | 2012069934 A1 | 5/2012 | | |
| WO | 2015113379 A1 | 8/2015 | | |
| WO | WO-2019049156 A1 * | 3/2019 | ............... | A01G 9/02 |

\* cited by examiner

PLANT CULTIVATION CONTAINER

The object of the invention is a plant cultivation container, wherein the plants do not need to be transplanted during cultivation or growth. One of the important factors when growing rather sensitive plants is that the plants are not subject to shock during cultivation, which is always present when the plants need to be transplanted into larger containers due to their growth. The plant cultivation container is provided with pull-out trays and this allows continuous adaptation of the container volume to the growth and development of the root system. The plant cultivation container of the invention provides for continuous oxygen and air supply to the root system and for development of fibrous roots contrary to root spiralisation which is typical of conventional containers.

The invention belongs to the field of cultivation of plants and vegetables.

The "Air Pot" system for cultivating plants is currently commercially available. It includes containers from recycled plastic provided over the entire surface with holes for the root system aeration. The system provides for continuous oxygen or air supply to the root system and for development of fibrous roots, however it does not provide for volume adaptation of the container. Once a plant is too big, it needs to be transplanted into larger containers.

Another similar commercially available system is the "Smart Pot" system. The container is made from special fabric from into containers of various volumes are formed. The special fabric also provides for continuous oxygen or air supply to the root system and for the development of fibrous roots. To a certain extent, it also provides for water retention after watering. It does not provide for adaptation of the container volume to the growth of a plant. Once a plant is too big, it needs to be transplanted into larger containers.

The mentioned problems are solved by a plant cultivation container of the invention.

The plant cultivation container is formed as an integral container of a preferably quadrangular shape with at least one pull-out tray. The pull-out tray has several functions: partitioning of container volume to compartments, retaining of excess water while watering, and as a drip tray when the entire container volume is in use. The bottom of the container is not flat but has grooves with holes, through which the excess water drains during watering. The container is optionally provided at least in segments on two opposing sides with an edge used as a grip for carrying the container.

Two container walls facing each other are formed as a flat surface, hereinafter referred as flat container walls, while the other two container walls, also facing each other, are formed in their central part as a recessed surface, hereinafter referred as a concave part of the container wall, with protruding flat surfaces formed on the left and on the right side of said concave part of the container wall, hereinafter referred as convex parts of the container wall. All container walls are provided with slits for receiving at least one of the pull-out trays. With the pull-out trays inserted into the slits the volume of the container is, along its height, divided into several compartments. The dimensions of the slits are adapted to the thickness and the height of the pull-out tray side walls and of the pull-out tray bottom. By inserting and removing the pull-out trays into and out of the slits the container volume can simply be adapted to the growth and development of the root system. The lower edge of the slits and of the additional gaps made in all the container walls lie preferably in the same plain.

A slit for the reception of the pull-out tray bottom, hereinafter a horizontal slit, is formed in both flat container walls and in the concave part of both other two container walls. The slit is formed preferably horizontally. A slit for the reception of an individual pull-out tray side wall, hereinafter a vertical slit, is formed in both flat container walls, preferably at the external edge of the container, and in each of both convex parts of the other two container walls, preferably at the external edge of the container. The slit is formed preferably vertically.

In each of the container walls at least one additional gap is made along the horizontal slits for air supply to the root system. In the event of several additional gaps formed along each of the horizontal slits, they are preferably arranged equidistantly. At least one of said additional gaps, hereinafter an indicator gap, is higher than is the height of the pull-out tray walls and reaches above the pull-out tray wall. Said indicator gap is used as an indicator to evaluate whether the root system in the compartment has grown to such an extent that the pull-out tray needs to be removed, thus increasing the volume of the container.

The pull-out trays are insertable into the slits on the side of flat container walls. Each of the pull-out trays is always adapted to the shape of the container and is preferably of a quadrangular shape. The width of the pull-out tray is somewhat smaller than the width of the flat container wall due to the formation of the vertical slits for receiving pull-out tray side walls, while the length of the pull-out tray is somewhat larger than width of the container wall comprising the concave part. Therefore a part of the pullout tray, after having been inserted into the slits, projects from the plain of the flat container walls on one and the other side. In this way, all four pull-out tray walls are distant from the container walls at least in part, thus creating a space for the air to reach the root system through the additional gaps. On the sides of the container with the flat container walls, the space is created due to a larger length of the pull-out tray, while on the sides of the container having the container walls with the concave and convex part, the space for air access is defined by the depth of the concave part. The pull-out tray side walls extend through the vertical slits formed in both convex parts and are distant from the concave part of the container wall.

The pull-out tray consists of a bottom and four walls, namely two pull-out tray side walls, the pull-out tray rear wall and the pull-out tray front wall, wherein the pull-out tray front wall is detachably secured to the pull-out tray. The pull-out tray bottom, two pull-out tray side walls and the pull-out tray rear wall are made from one piece. The pull-out tray front wall is formed as an independent piece consisting of two side parts, a bottom part and a transversal part, wherein the lower section of the side parts and the bottom parts are formed with a double wall thus creating a receiving gap, into which, once the pull-out tray front wall is secured to the pull-out tray, the pull-out tray bottom and two pull-out tray side walls fit in order to form a firm connection. The pull-out tray consists of two pieces in order to provide for insertion of the pull-out tray into the slits formed on the container walls.

The dimensions of the slits are always adapted to the dimensions of the pull-out tray in a way that a simple insertion and removal of the pull-out tray is possible. The width and the height of the horizontal slit is always adequately adapted to the thickness and the width of the pull-out tray bottom, the width and the height of the vertical slit is always adequately adapted to the thickness and the height of the pull-out tray side walls.

The plant cultivation container is preferably made from elastic plastic materials which may bend upon force exertion. The pull-out tray side walls are always inclined at a certain angle with respect to the vertical slit. This means that the angle formed between each of the pull-out tray side walls and the pull-out tray bottom is always somewhat bigger or smaller from the inclination angle of the vertical slit, formed between the vertical slit and the plain defined by the container bottom. This angle is greater than 0 degrees and smaller than 5 degrees. This angle preferably amounts to 3 degrees.

Due to ductility of the material and due to the above indicated different inclination of the pull-out tray side walls with respect to the vertical slits, a tight contact between the pull-out tray side walls and the vertical slit is formed when the pull-out tray side walls are inserted into the vertical slits. The plastic material slightly deforms in the contact area, thus water leakage in the contact area between the vertical slits and the pull-out tray side walls is prevented. As the pull-out tray side walls are formed at an inclination slightly different from the inclination of the vertical slits, possible deviations in the dimensions of the slits, which occur during the production of the container, are eliminated.

Figure 2:
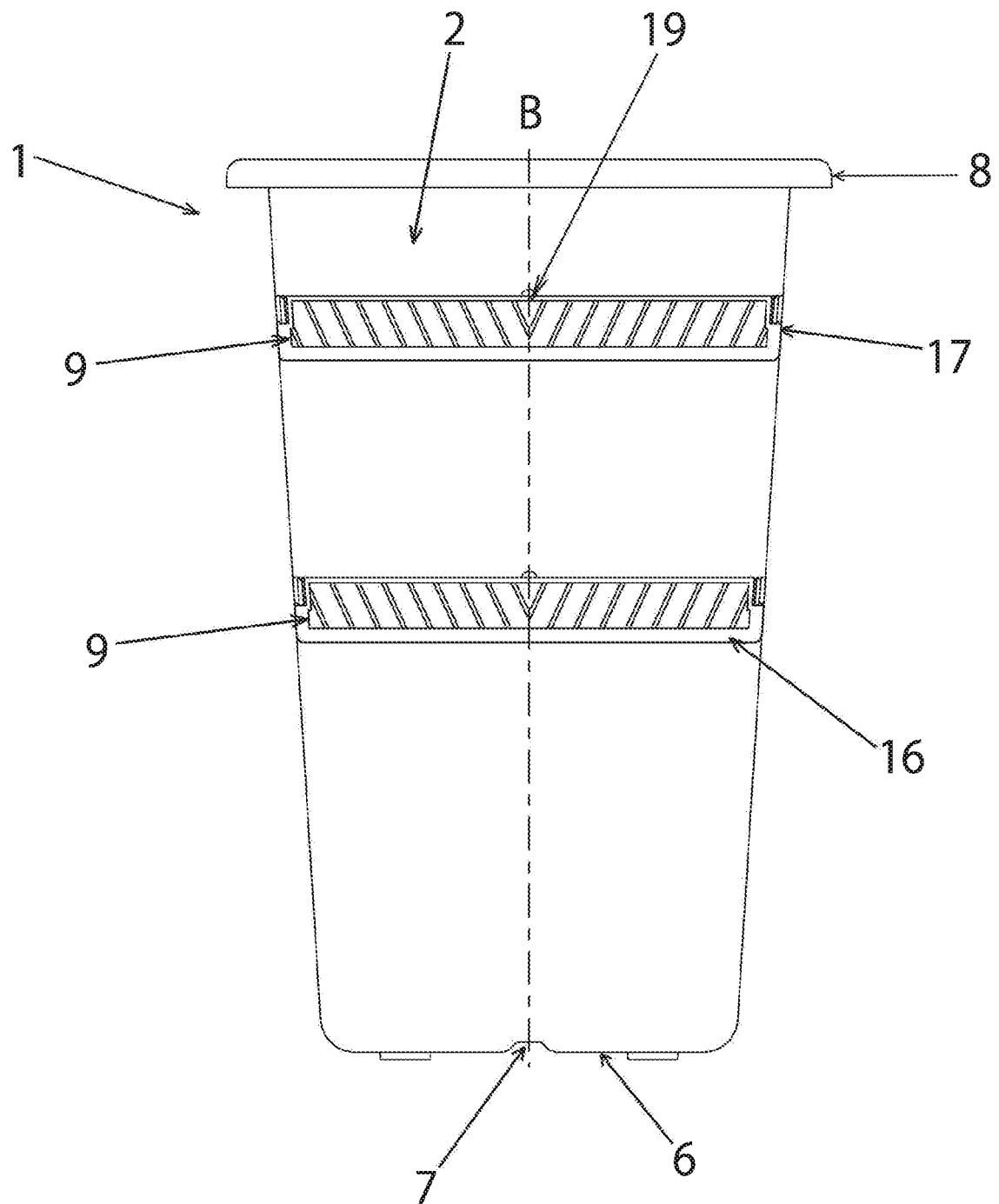
Figure 3:
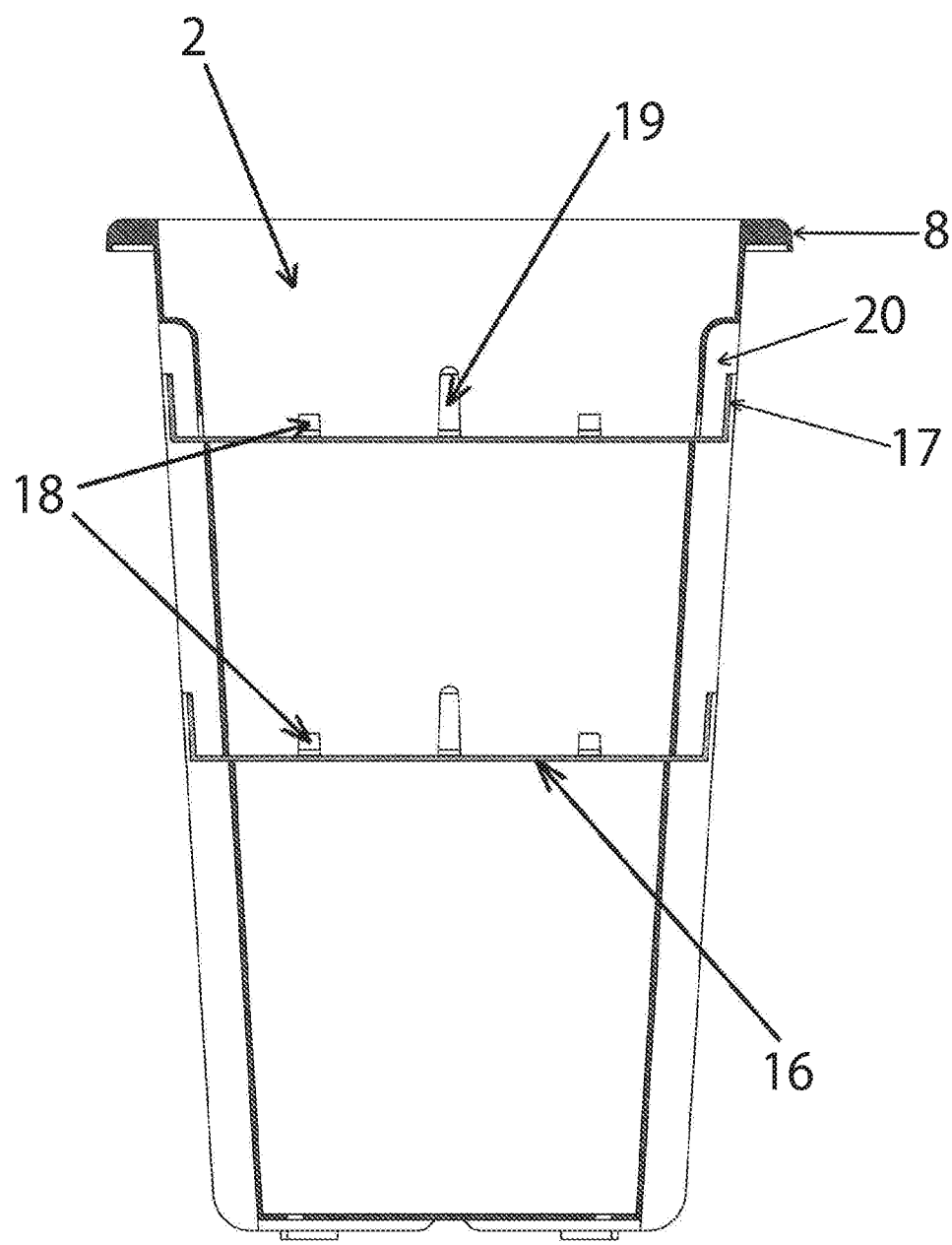
Figure 4:
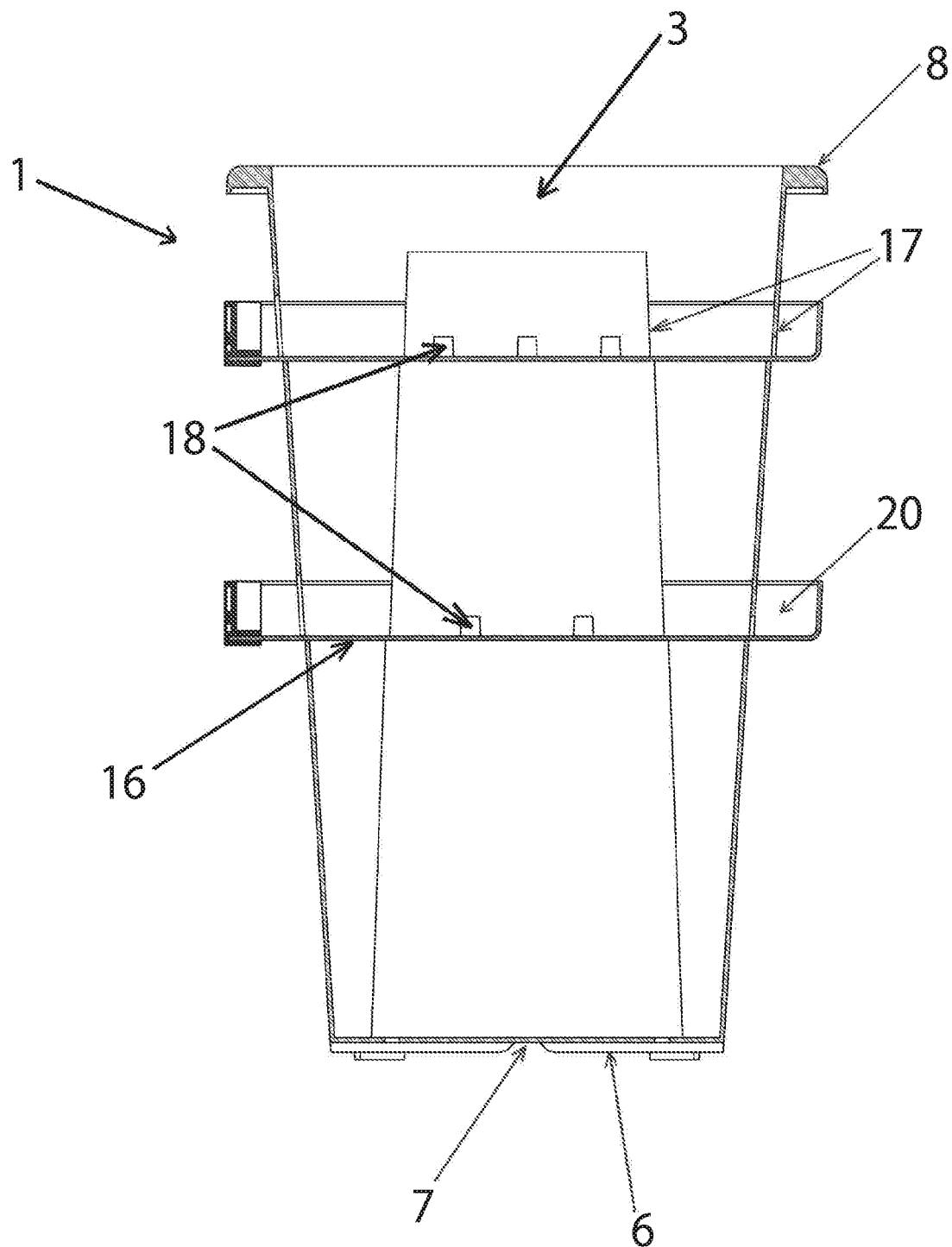
Figure 5:
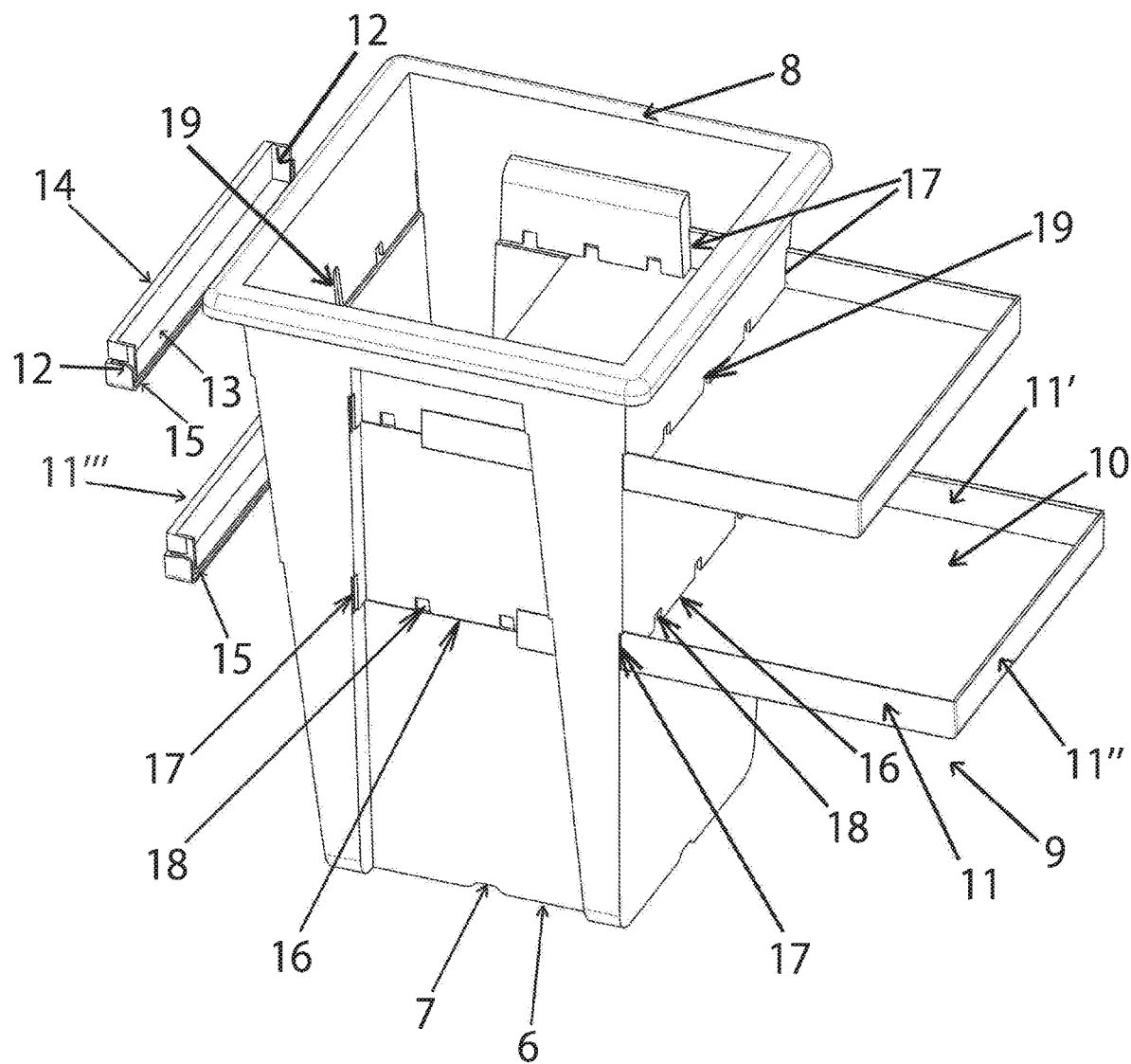

The invention will be further explained in more detail by way of an embodiment and drawings, in which:

FIG. 1 shows the container of the invention—side view with a concave part of the wall FIG. 2 shows the container of the invention—view from the side with a flat container wall FIG. 3 shows the container of the invention—cross-section along plain A FIG. 4 shows the container of the invention—cross-section along plain B FIG. 5 shows the container of the invention—axonometric projection A plant cultivation container 1 of the invention shown in FIGS. 1 to 5 is of a quadrangular shape and consists of four walls, wherein two container walls 2 facing each other, are formed as a flat surface, while the other two container walls 3 also facing each other, are formed in their central part as a concave part 4, with convex parts 5 formed on the left and on the right side of said concave part 4. The bottom 6 of the container 1 is provided with grooves 7 with holes (not shown in figures), while the upper part of the container is circumferentially provided with an edge 8 serving as a grip for transporting the container 1. The container 1 includes two pull-out trays 9. All container walls 2, 3 are provided with slits formed on various heights along the height of the container 1 for the reception of the pull-out trays 9. The dimensions of the slits are adapted to the thickness and the height of the pull-out tray side walls and the pull-out tray bottom, when the pull-out trays 9 are inserted into the slits.

The pull-out tray 9 consists of a pull-out tray bottom 10, two pull-out tray side walls 11, 11', a pull-out tray rear wall 11" and a pull-out tray front wall 11''' which is detachably secured to the pull-out tray 9. The pull-out tray bottom 10, the two pull-out tray side walls 11, 11' and the pull-out tray rear wall 11" are formed from one piece. The pull-out tray front wall 11''' is formed as an independent piece consisting of two lateral parts 12, a bottom part 13 and a transversal part 14, wherein the lower section of the two lateral parts 12 and the bottom part 13 are formed with a double wall thus creating a receiving gap 15, into which, once the pull-out tray front wall 11''' is attached to the pull-out tray 9, the pull-out tray bottom 10 and two pull-out tray side walls 11, 11' fit in order to form a firm connection. The pull-out tray 9 consists of two pieces in order to provide for insertion of the pull-out tray 9 into the slits formed on the container walls 2, 3.

A horizontal slit 16 for reception of the pull-out tray bottom 10 is formed in both flat container walls 2 and in the concave part 4 of both other two container walls 3. The slit 16 is formed horizontally. A vertical slit 17 for reception of an individual pull-out tray side walls 11, 11' is formed in both flat container walls 2 at the external edge of the container 1 and in each of both convex parts 5 of the other two container walls 3 at the external edge of the container 1. The vertical slit 17 is formed at an angle with respect to the plain defined by the bottom 6 of the container 1, such that the slit 17 extends in parallel with the convex part 5 of the container wall 3.

In each of the container walls 2, 3 additional gaps 18 are made along a the horizontal slits 16 for air supply to the root system said additional gaps 18 being equidistantly arranged. The central gap of said additional gaps 18 is an indicator gap 19 which is higher than the height of the pull-out tray rear wall 11" and the pull-out tray front wall 11''' and reaches above the said pull-out tray walls 11", 11''' and is used as an indicator to evaluate whether the root system in the compartment has grown to such an extent that the pull-out tray needs to be removed from the slits 16, 17, thus increasing the volume of the container.

The width and the height of the horizontal slit 16 is always adequately adapted to the thickness and the width of the pull-out tray bottom 10, the width and the height of the vertical slit 17 is always adequately adapted to the thickness and the height of the pull-put tray side walls 11, 11'.

The pull-out tray 9 is of a quadrangular shape. The width of the pull-out tray 9 is somewhat smaller than the width of the flat container wall 2 due to the vertical slits 17 for the reception of the pull-out tray side walls 11, 11', while the length of the pull-out tray 9 is somewhat larger than the width of the container wall 3 with the concave part 4 and the convex part 5, such that a part of the pull-out tray 9 projects from the plain of the flat container walls 2 on one and the other side. A space 20 is thus created for air access to the root system through additional gaps 18, 19.

The angle formed between each of the pull-out tray side walls 11, 11' and the pull-out tray bottom 10 is somewhat bigger from the angle formed between the vertical slit 17 and the plain which is defined by the container bottom 6.

When the plant cultivation container of the invention is used, the lowest compartment is first filled with adequate substrate for plant cultivation up to the first set of notches. A first pull-out tray is then inserted into the slits and a pull-out tray front wall is attached. Then a second compartment is filled with substrate up to the next set of slits, a next pull-out tray is inserted and a pull-out tray front wall is attached. The procedure is repeated depending on the number of compartments. A plant is planted into the last compartment. When the plant grows, its root system gets stronger and when the roots fill the entire compartment, which is evaluated by means of the indicator gap, a pull-out tray is optionally removed and the plant and the roots have the next compartment available for the growth.

The plant cultivation container of the invention allows a much better exploitation of the substrate because the plant roots fill up the entire volume of the cultivation container. Spiralisation of roots on the container bottom is observed in conventional containers, while the container of the invention is specific in being partitioned to compartments by pull-out trays. The job of a cultivator is simplified since there is no need for transplantation. The plants are not subject to transplantation shock due to contact with light. Thanks to the additional gaps formed in the horizontal slits, the entire root system is supplied with fresh air and oxygen. When this container is used, no extra drip trays need to be purchased, because the pull-out trays have a double function: a function of a drip tray and they also allow transfer of the roots to another compartment. The container also contributes to the cleanliness of a room since the substrate remains in the same container during the entire growth cycle.

The invention claimed is:

1. A plant cultivation system comprising:
an integral container of a quadrangular shape, the container comprising:
four container walls, and
a container bottom; and
at least one pull-out tray including a pull-out tray bottom, two pull-out tray side walls, a pull-out tray rear wall and a pull-out tray front wall, wherein said pull-out tray front wall is detachably secured to the at least one pull-out tray, and wherein all container walls are, along their height, provided with horizontal slits and vertical slits for receiving said at least one pull-out tray, wherein dimensions of said horizontal and vertical slits are adapted to a thickness and a height of the two pull-out tray side walls and of the pull-out tray bottom;
wherein said pull-out tray front wall is formed as an independent piece including two lateral parts, a bottom part and a transversal part, wherein a lower section of the two lateral parts and the bottom part are formed with a double wall thus creating a receiving gap, into which, once the pull-out tray front wall is detachably secured to the pull-out tray, the pull-out tray bottom and two pull-out tray side walls fit.

2. The plant cultivation system according to claim 1, wherein two of the four container walls face each other and are formed as a flat surface, while the other two of the four container walls also facing each other and are formed in their central part as a concave part, with protruding flat surfaces formed on the left and on the right side of said concave part.

3. The plant cultivation system according to claim 1, wherein an angle between each of the pull-out tray side walls and the pull-out tray bottom is greater than 0 degrees and smaller than 5 degrees from the angle between the vertical slit and the plane defined by the container bottom.

4. The plant cultivation system according to claim 1, wherein the container bottom includes grooves.

5. A plant cultivation system comprising:
an integral container of a quadrangular shape, the container comprising:
four container walls, and
a container bottom; and
at least one pull-out tray including a pull-out tray bottom, two pull-out tray side walls, a pull-out tray rear wall and a pull-out tray front wall, wherein said pull-out tray front wall is detachably secured to the at least one pull-out tray, and wherein all container walls are, along their height, provided with horizontal slits and vertical slits for receiving said at least one pull-out tray, wherein dimensions of said horizontal and vertical slits are adapted to a thickness and a height of the two pull-out tray side walls and of the pull-out tray bottom;
wherein the horizontal slit is configured to receive the pull-out tray bottom, and is formed in each of both flat container walls and in a concave part of each of the other two container wall, and the vertical slits are configured to receive the two pull-out tray side walls and are formed in each of the flat container walls and in each of convex parts of each of the other two container walls, at an external edge of the container, wherein each of said vertical slits is formed at an angle with respect to the plain defined by the container bottom, such that each of said vertical slits extends in parallel with the convex part of the container wall.

6. The plant cultivation system according to claim 5, wherein a width and a height of the horizontal slit is adapted to the thickness and the width of the pull-out tray bottom, a width and a height of the vertical slit is adapted to a thickness and a height of the pull-out tray side walls.

7. The plant cultivation system of claim 5, wherein an angle between each of the pull-out tray side walls and the pull-out tray bottom is greater than 0 degrees and smaller than 5 degrees from the angle between the vertical slit and the plane defined by the container bottom.

8. The plant cultivation system of claim 5, wherein the container bottom includes grooves.

9. A plant cultivation system comprising:
an integral container of a quadrangular shape, the container comprising:
four container walls, and
a container bottom; and
at least one pull-out tray including a pull-out tray bottom, two pull-out tray side walls, a pull-out tray rear wall and a pull-out tray front wall, wherein said pull-out tray front wall is detachably secured to the at least one pull-out tray, and wherein all container walls are, along their height, provided with horizontal slits and vertical slits for receiving said at least one pull-out tray, wherein dimensions of said horizontal and vertical slits are adapted to a thickness and a height of the two pull-out tray side walls and of the pull-out tray bottom;
wherein in each of the container walls additional gaps are made along the horizontal slits, wherein said additional gaps are equidistantly arranged, and wherein a central gap of said additional gaps is an indicator gap which is higher than the height of the pull-out tray rear wall and the pull-out tray front wall.

10. A plant cultivation system comprising:
an integral container of a quadrangular shape, the container comprising:
four container walls, and
a container bottom; and
at least one pull-out tray including a pull-out tray bottom, two pull-out tray side walls, a pull-out tray rear wall and a pull-out tray front wall, wherein said pull-out tray front wall is detachably secured to the at least one pull-out tray, and wherein all container walls are, along their height, provided with horizontal slits and vertical slits for receiving said at least one pull-out tray, wherein dimensions of said horizontal and vertical slits are adapted to a thickness and a height of the two pull-out tray side walls and of the pull-out tray bottom;
wherein the width of the at least one pull-out tray is somewhat smaller than the width of the flat container wall due to the vertical slits for the reception of the pull-out tray side walls, and the length of the at least one pull-out tray is somewhat larger than the width of the container wall with the concave part, such that a part of the at least one pull-out tray projects from the plain of the flat container walls on one and the other side thus creating a space for air access to the root system through additional gaps.

11. The plant cultivation system of claim 9, wherein angle between each of the pull-out tray side walls and the pull-out tray bottom is greater than 0 degrees and smaller than 5 degrees from the angle between the vertical slit and the plane defined by the container bottom.

12. The plant cultivation system of claim 9, wherein the container bottom includes grooves.

13. The plant cultivation system of claim 10, wherein an angle between each of the pull-out tray side walls and the pull-out tray bottom is greater than 0 degrees and smaller than 5 degrees from the angle between the vertical slit and the plane defined by the container bottom.

14. The plant cultivation system of claim 10, wherein the container bottom includes grooves.

* * * * *